United States Patent [19]

Vargiu et al.

[11] 3,869,387

[45] Mar. 4, 1975

[54] PROCESS FOR THE EXTRACTION OF PHENOL FROM WASTE WATERS IN THE FORM OF UREA-FORMALDEHYDE-PHENOL CONDENSATES

[75] Inventors: Silvio Vargiu; Sesto S. Giovanni; Giorgio Mazzoleni, all of Milan; Silvestro Pezzoli, Biassono, all of Italy

[73] Assignee: Societa Italiana Resine S.I.R. S.p.A., Milan, Italy

[22] Filed: June 12, 1973

[21] Appl. No.: 369,345

[30] Foreign Application Priority Data

June 13, 1972  Italy................................. 25583/72

[52] U.S. Cl.................... 210/54, 210/59, 260/51.5, 260/57 R, 260/627
[51] Int. Cl............................................. C02b 1/18
[58] Field of Search............ 210/59, 60, 43, 47, 54; 260/51.5, 57 R, 627

[56] References Cited

UNITED STATES PATENTS

| | | | |
|---|---|---|---|
| 3,404,198 | 10/1968 | Guyer................................ | 260/51.5 |
| 3,539,484 | 10/1970 | Bowman et al.................... | 260/51.5 |
| 3,655,047 | 4/1972 | Adegeest............................. | 210/59 |
| 3,736,292 | 5/1973 | Thayer et al....................... | 260/57 R |

*Primary Examiner*—Thomas G. Wyse
*Assistant Examiner*—Benoit Castel
*Attorney, Agent, or Firm*—Sughrue, Rothwell, Mion, Zinn & Macpeak

[57] ABSTRACT

Phenol is extracted from waste waters by reacting formaldehyde, urea and phenol containing waste waters at a basic pH and high ratios of formaldehyde to urea, keeping the product at relatively acidic pH-values for short reaction times, reacting the obtained product with additional urea and waste water at slightly acidic pH-values and low ratios of formaldehyde to urea and adjusting the obtained product to a basic pH. The condensates obtained are suitable for use as adhesives and binders for wood.

3 Claims, No Drawings

PROCESS FOR THE EXTRACTION OF PHENOL FROM WASTE WATERS IN THE FORM OF UREA-FORMALDEHYDE-PHENOL CONDENSATES

The invention relates to a process for the extraction of phenol from waste waters in the form of urea-formaldehyde-phenol condensates. These synthetic resin products can be used in particular as adhesives and binding agents.

The practically complete extraction and removal of chemical products from industrial waste waters is a problem that is becoming increasingly important, on the one hand to improve industrial processes and on the other to minimize environmental pollution or to eliminate it completely. For this reason, it is particularly desirable to eliminate successfully the causes of environmental pollution and at the same time to improve the economy of industrial processes.

Waste waters contaminated with phenol occur in the production of phenol and phenolic resins and in other industrial processes. The waste waters, which generally contain 0.01 to 5 wt.% of phenol, must be subjected to a purification because of the high toxicity of phenol.

It is known that the separation of phenol from waste waters by distillation presents considerable difficulties in practice, and this hinders satisfactory separation. However, the separation of phenol from water by distillation can be facilitated by prior chemical blocking. Chemical blocking is a term used for the conversion of phenol into products having low volatilities by reaction with a suitable reagent.

However, processes of this type must satisfy the following four conditions:

1. The cost of the blocking agent should be low.
2. No expensive operations should be necessary for the blocking of the phenol and subsequent separation of the water.
3. The quantities of phenol and blocking agent recovered should be very high.
4. The products remaining after the separation of the water should be of industrial value. Their value should, as far as possible, correspond to or exceed the recovery costs.

No processes that satisfy all these conditions at the same time are known at present.

One object of the invention is therefore to provide a simple and cheap process for the extraction of phenol from industrial waste waters, in which the above conditions are satisfied and in which a valuable product that is suitable for the production of adhesives and binders, particularly for wood, is obtained. Further objects become apparent from the following description.

It has been found in accordance with the invention that phenol can be extracted from waste waters by multistage reaction with urea and formaldehyde if the molar ratios of the reactants and the pH of the raction medium are controlled in the various stages. In particular, it has been found that a satisfactory separation of phenol from waste waters is achieved if a basic pH value and high molar ratios of formaldehyde to urea are used in a first reaction step, relatively acidic pH values and short reaction times in a second reaction step, and slightly acidic pH values and low molar ratios of formaldehyde to urea in a third reaction step.

The invention thus relates to a process for the extraction of phenol from waste waters in the form of urea-formaldehyde-phenol condensates, characterized in that a. formaldehyde, urea, and a waste water containing phenol in a concentration of about 0.01 to about 5 wt.% are allowed to react for about 15 to about 60 minutes at temperatures of about 60° to about 95°C and at a pH of about 8 to about 9.5, the molar ratio of formaldehyde to phenol being about 2500 : 1 to about 100 : 1 and that of formaldehyde to urea being about 2 : 1 about 2.7 : 1, b. the product obtained in step (a) is kept at temperatures of about 60° to about 95°C and at a pH of about 4.0 to about 5.5 for about 4 to about 10 minutes, c. the product obtained in step (b) is allowed to react with additional urea and with additional waste water containing phenol for about 60 to about 240 minutes at temperatures of about 60° to about 95°C and at a pH of about 5.7 to about 6.8, the molar ratio of formaldehyde to phenol being about 2000 : 1 to about 80 : 1 and that of formaldehyde to urea being about 1.40 : 1 to about 1.65 : 1, and d. the product obtained in step (c) is adjusted to a pH of about 8 and the synthetic resin product formed is isolated.

The condensates of urea, formaldehyde, and phenol obtained by this process are valuable adhesives and binders for the wood-processing industry, e.g. for preparing plywood. In particular, they are superior to known condensation products of urea and formaldehyde with respect to the water resistance of the glue lines and the green strength.

The reaction time in step (a) of the process of the invention is about 15 to about 60 minutes, but is adjusted to a value such that the reaction product has a viscosity of about 20 to about 35 seconds measured at 25°C in a no. 4 Ford cup.

In reaction step (b), formic acid, generally as an aqueous solution, is added to maintain the desired pH range. The reaction temperatures and the ratios of the reactants are the same as in step (a). The conditions are adjusted so that the reaction product has a viscosity of about 35 to about 60 seconds measured at 25°C in a no. 4 Ford cup.

The reaction product obtained in step (b) is mixed with an inorganic base, generally sodium hydroxide, to bring the pH to an approximately neutral value. The product neutralized in this way is treated in step (c), as described earlier, with fixed quantities of urea and a waste water containing phenol. The reaction time in step (c) is generally about 60 to about 240 minutes, but is adjusted to a value such that the product obtained has a viscosity of about 75 to about 110 seconds measured at 25°C in a no. 4 Ford cup. The product obtained in step (c) is finally cooled and adjusted to a pH of about 8 by addition of sodium hydroxide or another inorganic base.

In a preferred embodiment of the process of the invention, fluid reaction products of urea and formaldehyde, which are known as "formurea" or "ureic syrup" (cf. U.S. Pat. Nos. 2,467,212 and 2,652,377 and German Pat. No. 1,239,290), may be fed into step (a). In another preferred embodiment, step (c) is carried out in several stages, urea and an independent stream of a waste water containing phenol being introduced in each stage. It has been found advantageous in practice to carry out step (c) in two stages.

The condensates obtained by the process of the invention, which are suitable for use as adhesives and binders for wood, generally have a content of dry components of about 66 wt.%.

When waste waters having a low phenol content are used, it may be necessary to remove part of the water during the reaction to bring the water content of the adhesive or binder to the above-mentioned range. For this purpose, the water may be partly removed by distillation in step (a) or from the reaction product obtained in step (c). In the latter case, the viscosity data will obviously differ from the values given above.

In the following examples, a waste water containing phenol that is formed in the production of phenolic resins of the resol or novolak type is used. This waste water contains 3.5% of phenol, 0.2% of methylolphenol, and 0.7% of formaldehyde. Ureic syrup having a pH of 9, a formaldehyde content of 59 wt.% and a urea content of 24.5 wt.% is also used.

The invention is illustrated by the following non-limiting examples. The viscosity is always measured at 25°C in a no. 4 Ford cup.

Example 1

A stainless steel autoclave is charged with 2165 parts by weight of ureic syrup, waste water containing 321 parts by weight of phenol, and 624 parts by weight of urea. The mixture is stirred and heated to 90°C. After 15 minutes the pH is adjusted to 5.1 to 5.2 by addition of 11 parts by weight of 10% aqueous formic acid. The temperature of the mixture is kept for about 8 min at 90°C until the product has a viscosity of 40 to 42 seconds. The pH is then adjusted to 7 to 7.6 with 9 parts by weight of 10% sodium hydroxide solution. 122 parts by weight of urea and waste water containing 64.5 parts by weight of phenol are then added. The temperature is kept at 90°C for about 60 min and the pH at 6.5 to 6.6 until the viscosity of the product has a value of 60 to 62 seconds. Finally, 275 parts by weight of urea and waste water containing 146.5 parts by weight of phenol are added and the temperature is kept for about 60 min at 90°C and the pH at 6.5 to 6.6 until the product has a viscosity of 83 to 86 seconds. The product is then rapidly cooled and adjusted to a pH of about 8 by addition of 6 parts by weight of 10% sodium hydroxide solution.

Example 2

A stainless steel autoclave is charged with 2165 parts by weight of ureic syrup, waste water containing 763 parts by weight of phenol, and 624 parts by weight of urea. 704 parts by weight of water are evaporated off under reduced pressure at 60°C. The mixture is then heated to 90°C for about 50 min (including evaporating the water) and the pH adjusted to 5.1 to 5.2 by addition of 11 parts by weight of 10% formic acid. The temperature of the mixture is kept at 90°C for about 8 min until the product has a viscosity of 35 seconds. The pH is then adjusted to 7.0 to 7.5 by addition of 9 parts by weight of 10% aqueous sodium hydroxide solution. Finally, 397 parts by weight of urea and waste water containing 486 parts by weight of phenol are added and the temperature is kept at 90°C for about 140 min and the pH at 6.5 to 6.6 until the viscosity of the product has a value of 83 to 86 seconds. The product is then rapidly cooled, and 6 parts by weight of 10% sodium hydroxide solution are added.

Example 3

A stainless steel autoclave is charged with 2165 parts by weight of ureic syrup, waste water containing 763 parts by weight of phenol, and 624 parts by weight of urea. The mixture is stirred and heated to 90°C. After 15 min, the pH is adjusted to 5.1 to 5.2 by addition of 12 parts by weight of 10% aqueous formic acid. The condensation is continued at 90°C for about 5 min until the viscosity of the product has a value of 16 seconds. The pH is then adjusted to 7 to 7.5 by addition of 11 parts by weight of 10% sodium hydroxide solution. 122 parts by weight of urea and waste water containing 150 parts by weight of phenol are then added. The temperature is kept at 90°C for about 45 min and the pH at 6.2 to 6.3 until the product has a viscosity of 18 seconds. 275 parts by weight of urea and waste water containing 336 parts by weight of phenol are then added and the mixture is kept at 90°C for about 45 min and the pH at 6.2 to 6.3 until the viscosity of the product reaches a value of 21 to 22 seconds. The product is then rapidly cooled and neutralized by addition of 6 parts by weight of 10% sodium hydroxide solution. Finally, 704 parts by weight of water are distilled off at 50°C under reduced pressure. The product obtained has a viscosity of 83 to 86 seconds.

Example 4

A stainless steel autoclave is charged with 2165 parts by weight of ureic syrup, waste water containing 321 parts by weight of phenol, and 624 parts by weight of urea. The mixture is stirred and heated to 90°C. After 15 min, the pH is adjusted to 5.1 to 5.2 by addition of 11 parts by weight of 10% aqueous formic acid. The temperature is kept at 90°C for about 5 min until the viscosity of the product reaches a value of 40 to 42 seconds. The pH is then adjusted to 7.0 to 7.5 by addition of 9 parts by weight of 10% sodium hydroxide solution. 122 parts by weight of urea and waste water containing 64.5 parts by weight of phenol are then added. The temperature is kept at 90°C for about 60 min and the pH at 6.5 to 6.6 until the viscosity of the product has a value of 60 to 62 seconds. 275 parts by weight of urea and waste water containg 146.5 parts by weight of phenol are then added. The temperature is kept at 90°C for about 60 min and the pH at 6.5 to 6.6 until the viscosity of the product has a value of 85 to 86 seconds. Finally, the product is rapidly cooled, and 6 parts by weight of 10% sodium hydroxide solution are added.

Table I shows the properties of the products obtained in Examples 1–4. In particular, the table shows the following values:

1. viscosity, measured at 25°C in a no. 4 Ford cup, in seconds
2. pH
3. free formaldehyde in wt.%
4. semi-combined formaldehyde in wt.%
5. compatibility in water
6. curing time at 60°C
7. wt.% of dry substance
8. density at 20°C
9. stability at 20°C in months The free formaldehyde is determined by oxidation to formic acid with hydrogen peroxide, neutralization of the formic acid with excess sodium hydroxide, and titration of the unreacted sodium hydroxide.

The semi-combined formaldehyde is determined by treatment with an excess of iodine in alkaline medium and titration of the excess iodine with thiosulfate. This gives the total quantity of free and semi-combined formaldehyde (or formaldehyde methylolate). The quantity of semi-combined formaldehyde can then be determined by difference. The water compatibility is determined by introduction of 40 ml of the resin under test into a 100 ml Nessler tube and dilution with water to 50%. Small quantities of distilled water are added at 25°C until the mixture becomes cloudy. The compatibility in water is thus expressed in parts by volume of liquid resin per part by volume of water.

The curing time is determined by addition of 10 ml of a solution containing 5 parts by weight of urea, 5 parts by weight of ammonium chloride, and 90 parts by weight of water to 100 parts by weight of resin. The mixture is homogenized and introduced into a container adjusted to 60°C. The curing time is the time between the placing of the mixture in the thermostat and gelation.

The stability is determined by storage of a 500 g sample of the resin at 20°C and measurement of the viscosity with passing time. When the viscosity in a no. 4 Ford cup at 25°C exceeds 300 seconds, the product is regarded as unusable. The time that elapses before this viscosity value is reached is referred to as the stability time.

and pressure (25 to 30 kg/cm²) and the chip board is formed. After removal from the press, the chip board is conditioned at room temperature and is finally trimmed and smoothed. The following properties of the board are determined:

1. bending strength according to DIN 52 362, kg/cm²
2. tensile strength in the transverse direction according to DIN 53 365, kg/cm²
3. density in g/cm³ according to DIN 52 361
4. swelling in water (wt.%) after 2 hours at 20°C, according to DIN 52 364
5. swelling in water (wt.%) after 24 hours at 20°C, according to DIN 52 364
6. green strength. This property is determined on the resintreated wood particles. Dry weight of the resin based on dry wood particles (wt.%) = 10. Moisture content of the wood particles (wt.%) based on dry wood particles = 13 ± 2.

A mat having the dimensions 30 × 40 cm is prepared from 1 kg of resintreated wood particles. It is then cold pressed for 10 seconds at 22 kg/cm². The green strength is determined manually as a function of the consistency of the board according to the following scale with the following extreme values:
high consistency = 500
low consistency = 600.

Table I

|  | Example |  |  |  |
|---|---|---|---|---|
|  | 1 | 2 | 3 | 4 |
| Viscosity, sec | 125 | 120 | 120 | 115 |
| pH | 8.3 | 8.0 | 8.2 | 8.3 |
| Free formaldehyde, wt.% | 0.8 | 1.1 | 0.8 | 0.9 |
| Semi-combined formaldehyde, wt.% | 18.3 | 18.8 | 17.6 | 19.0 |
| Compatibility in water | 1:2.5 | 1:2.5 | 1:2.5 | 1:2.5 |
| Curing time at 60°C | 10 min.30 sec. | 9 min.15 sec. | 9 min.35 sec. | 9 min. |
| Wt.% of dry substance | 66.7 | 66.5 | 66.6 | 66.0 |
| Density at 20°C | 1.287 | 1.288 | 1.288 | 1.288 |
| Stability at 20°C, months | 3 | 1 | 3 | 3 |

Table II

| Chip boards | Example |  |  |  |
|---|---|---|---|---|
|  | 1 | 2 | 3 | 4 |
| Bending strength | 212 | 210 | 218 | 215 |
| Tensile strength in the transverse direction | 9 | 8.9 | 9.2 | 9 |
| Density | 0.74 | 0.74 | 0.74 | 0.74 |
| Swelling in water (2 hours) | 12.7 | 12.9 | 12.8 | 13.3 |
| Swelling in water (24 hours) | 14.3 | 14.1 | 14.6 | 15.5 |
| Green strength | 545 | 545 | 545 | 550 |

Table II shows the properties of chip boards produced with the products of examples 1 – 4. The chip boards were produced as follows.

A mixture of 100 parts by weight of the product of the invention, 20 to 30 parts by weight of water, and 1 part by weight of ammonium chloride is sprayed on predried chips so that the weight ratio of wood to dry components of the resin is 100:10. A mat is prepared from the resin-treated chips and is first cold-pressed on a conveyor belt at a pressure of 15 to 30 kg/cm² and then introduced into a multistage press, in which the resin cures under the influence of heat (150° to 170°C)

The plywood is produced as follows.

A mixture of 100 parts by weight of the product of the invention, 50 to 70 parts by weight of water, 40 to 50 parts by weight of organic fillers (e.g. sawdust, ground nut shells, or flour), and 1 part by weight of ammonium chloride is applied with a roller to predried, rolled-out, or cut wood in a quantity of 180 to 230 g/m². A stack is then produced from an odd number of sheets, the wood fibres being arranged at an angle of 90° in each case. The stack is then pressed under the influence of heat (about 100°C) and pressure (7 to 12 kg/cm²). The resin cures and the plywood is formed.

After removal from the press, the plywood is conditioned at room temperature and finally trimmed and smoothed. The following tests are carried out on the plywood:
1. knife test
2. tensile shear strength in kg/cm$^2$
3. percent of residual fibers These three tests are carried out in accordance with British Standard 1455-1963 and are summarized in Table III:

Table III

| Plywood | Example | | | |
|---|---|---|---|---|
| | 1 | 2 | 3 | 4 |
| Knife test | 5 | 5 | 5 | 5 |
| Tensile shear strength | 18.7 | 19.1 | 18.9 | 19 |
| Percent of residual fibres | 90 | 90 | 85 | 90 |

Table IV shows the same results as Table III for plywood after immersion in water at about 20°C for 16 to 24 hours in accordance with British Standard 1455-1963.

Table IV

| Plywood | Example | | | |
|---|---|---|---|---|
| | 1 | 2 | 3 | 4 |
| Knife test | 1-2 | 1-2 | 1-2 | 0-1 |
| Tensile shear strength | 9.1 | 10.1 | 10.3 | 8.2 |
| Percent of residual fibres | 85 | 80 | 85 | 10 |

What we claim is:

1. Process for the extraction of phenol from waste water in the form of urea-formaldehyde-phenol condensates, characterized in that a. formahldehyde, urea, and a waste water containing phenol in a concentration of about 0.01 to about 5 wt.% are reacted for about 15 to 60 minutes at temperatures of about 60 to about 95°C and a pH of about 9.5, the molar ratio of formaldehyde to phenol being from 2500 : 1 to about 100 : 1 and that of formaldehyde to urea about 2 : 1 to about 2.7 : 1 to obtain a first reaction product with a viscosity of about 20 to about 35 seconds measured at 25°C in a No. 4 Ford cup, b. the first reaction product is thereafter kept at temperatures of about 60° to about 95°C and at a pH of about 4.0 to about 5.5 for about 4 to about 10 minutes to obtain a second reaction product with a viscosity of about 35 to about 60 seconds measured at 25°C in a No. 4 Ford cup, the second reaction product is thereafter reacted with additional urea and waste water containing phenol for about 60 to about 240 minutes at temperatures of about 60° to about 95°C and at a pH of about 5.7 to about 6.8, the molar ratio of formaldehyde to phenol being about 2000 : 1 to about 80 : 1 and that of formaldehyde to urea being about 1.40 : 1 to about 1.65 : 1 to obtain a third reaction product with a viscosity of about 75 to about 110 seconds measured at 25°C in a No. 4 Ford cup, d. the third reaction product is thereafter brought to a pH of about 8 and said urea-formaldehydephenol condensate formed is isolated.

2. Process in accordance with claim 1, characterized in that in step (a), the formaldehyde is introduced together with part of the urea in the form of formurea.

3. Process in accordance with claim 1, characterized in that in step (c), urea and a waste water containing phenol are introduced in two successive operations.

* * * * *